United States Patent
Itoh et al.

[19]

[11] Patent Number: 6,153,689
[45] Date of Patent: Nov. 28, 2000

[54] CURABLE POLYMETHYLSILOXANE COMPOSITION

[75] Inventors: Maki Itoh; Tetsuyuki Michino, both of Kanagawa; Akihito Sakakibara; Akihito Saitoh, both of Shizuoka, all of Japan

[73] Assignee: Dow Corning Asia, Ltd., Yamakita-machi, Japan

[21] Appl. No.: 08/912,514

[22] Filed: Aug. 18, 1997

[30] Foreign Application Priority Data

Aug. 19, 1996 [JP] Japan ................................. 8-217436

[51] Int. Cl.$^7$ .................................................. C08L 83/04
[52] U.S. Cl. ........................... 524/588; 524/858; 524/755; 524/770; 524/773; 528/10
[58] Field of Search .................. 524/588, 858, 524/755, 770, 773; 528/10

[56] References Cited

U.S. PATENT DOCUMENTS

| | | | |
|---|---|---|---|
| 4,349,609 | 9/1982 | Takeda et al. | 428/429 |
| 4,399,266 | 8/1983 | Matsumura et al. | 528/10 |
| 4,408,009 | 10/1983 | Mallon | 524/858 |
| 4,670,299 | 6/1987 | Fukuyama et al. | 427/96 |
| 5,045,592 | 9/1991 | Weiss et al. | 524/755 |
| 5,200,487 | 4/1993 | Lagarde et al. | 528/21 |
| 5,236,984 | 8/1993 | Yamamoto et al. | 524/233 |
| 5,412,053 | 5/1995 | Lichtenhan et al. | 528/9 |

FOREIGN PATENT DOCUMENTS

| | | | |
|---|---|---|---|
| 868996 | 4/1971 | Canada | 402/24 |
| 0 260 966 | 3/1988 | European Pat. Off. | C09D 3/82 |
| 0 406 911 A1 | 1/1991 | European Pat. Off. | C08G 77/06 |
| 0 526 887 A1 | 2/1993 | European Pat. Off. | C08G 77/16 |
| 0 786 489 A1 | 7/1997 | European Pat. Off. | C08G 77/16 |
| 51-2736 | 1/1979 | Japan | C09D 3/82 |
| 60-17214 | 1/1985 | Japan | F01L 1/34 |
| 62-55554 | 3/1987 | Japan | G01N 27/46 |
| 1-143773 | 6/1989 | Japan | B23K 9/10 |
| 3-20331 | 1/1991 | Japan | C08G 77/06 |
| 3-227321 | 10/1991 | Japan | C08G 77/16 |
| 3-244679 | 10/1991 | Japan | C09D 183/04 |
| 5-163463 | 6/1993 | Japan | C09D 183/04 |
| WO 97/07164 | 2/1997 | Japan | C08G 77/16 |

OTHER PUBLICATIONS

Laine et al. "Synthesis and High–Temperature Chemistry of Methylsilsesquioxane Polymers Produced by Titanium-–Catalyzed Redistribution of Methylhydridooligo– and –polysiloxanes.", Chemistry of Materials, pp. 464–472, 1990.

Wacker–Chemie GmbH; Munich, Mar. 1984; Methyl Silicone Resins; SME 10–160.843.

Wacker–Chemie GmbH; Munich, Jan. 1983; Wacker Silicone Resin Solution HK 15; SME10–152.831.

Wacker–Chemie GmbH; Wacker Silicone Resin MK (Methyl polysiloxane); SME 10–146.8110 (replacing SME 10–114.793).

S. Nakahama, et al., Contemporary Topics in Polymer Science, vol. 4, 1984, p. 105.

Y. Abe, et al., J. Polym. Sci. Part A Polym. Chem., 1995, vol. 33, p. 751.

*Primary Examiner*—Margaret G. Moore
*Attorney, Agent, or Firm*—Duane, Morris & Heckscher, LLP.

[57] ABSTRACT

The present invention provides a curable polymethylsilsesquioxane composition that uses polymethylsilsesquioxane obtained from inexpensive precursors and that provides a hard, scratch-resistant, highly corrosion-resistant, water-repellent, and transparent cured film. The curable polymethylsilsesquioxane composition of the invention includes a polymethylsilsesquioxane having the general formula

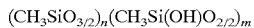

$(CH_3SiO_{3/2})_n(CH_3Si(OH)O_{2/2})_m$ and a predetermined number-average molecular weight, Mn, from 380 to 2,000, wherein m and n are positive numbers that provide the predetermined Mn, with the proviso that the value of $m/(m+n)$ is less than or equal to $0.152/(Mn \times 10^{-3})+0.10$ and greater than or equal to $0.034/(Mn \times 10^{-3})$ and 10 to 250 weight parts colloidal silica.

7 Claims, 1 Drawing Sheet

CURABLE POLYMETHYLSILOXANE COMPOSITION

BACKGROUND OF THE INVENTION

1. Field of the Invention

The present invention relates to generally to curable coating compositions and more particularly to a curable polymethylsilsesquioxane composition that provides a highly water-repellent and strongly corrosion-resistant cured film.

2. Description of the Prior Art

Silicone resins that contain 1.5 oxygen atoms per silicon atom are generically known as polysilsesquioxanes. The polysilsesquioxanes are highly heat resistant and exhibit good electrical insulation properties and flame retardancy. Because of these properties, polysilsesquioxanes have been used as resist materials and interlayer dielectric films in semiconductor fabrication (see, among others, "Shirikoon Handobukku" (English title: Silicone Handbook), edited by Kunio Itoh, published by Nikkan Kogyo Shinbunsha (1990)).

Methods are already known for the synthesis of polymethylsilsesquioxane. For example, polymethylsilsesquioxane can be synthesized by dissolving methyltrichlorosilane in the presence of amine in a single solvent or mixture of solvents selected from ketones and ethers, adding water to this system dropwise to effect hydrolysis, and then heating to effect condensation (see Japanese Patent Publication (Kokoku) Numbers Sho 60-17214 (17,214/1985) and Hei 1-43773 (43,773/1989) and U.S. Pat. No. 4,399,266). Another synthesis example is taught in EP 0 406 911 A1. This reference teaches the dissolution of a trifunctional methylsilane in organic solvent;

then hydrolysis by the dropwise addition of water to this solution at a temperature from −20° C. to −50° C. under an inert gas pressure of 1,000 to 3,000 Pa; and thereafter condensation by heating. Yet another synthesis example is disclosed in Japanese Patent Application Laid Open (Kokai or Unexamined) Number Hei 3- 20331 (20,331/1991). This reference teaches the reaction in organic solvent of methyltriacetoxysilane with an equivalent amount of alcohol and/or water to synthesize the alkoxyacetoxysilane; polycondensation of the alkoxyacetoxysilane in organic solvent in the presence of sodium bicarbonate to give a prepolymer; and condensation of this prepolymer by heating in the presence of at least 1 catalyst selected from the alkali metal hydroxides, alkaline-earth metal hydroxides, alkali metal fluorides, alkaline-earth metal fluorides, and triethylamine. Yet another synthesis example is found in Japanese Patent Application Laid Open (Kokai or Unexamined) Number Hei 3-227321 (227,321/1991). This reference teaches the dissolution of alkali metal carboxylate and lower alcohol in a mixed liquid system that forms two phases (water and hydrocarbon solvent); the dropwise addition of methyltrihalosilane into this system to effect hydrolysis; and condensation by heating.

The polymethylsilsesquioxanes afforded by these methods share a characteristic feature: they are hard but brittle. Some of the preceding references even include tactics for addressing this problem. Japanese Patent Publication (Kokoku) Number Hei 1-43773 instructs regulating the fraction with molecular weight ≦20,000 (molecular weight as determined by gel permeation chromatography (GPC) calibrated with polystyrene standards) to 15 to 30 weight % of the polymethylsilsesquioxane. However, even this does no more than enable the preparation of coatings with thicknesses of about 1.8 to 2.0 μm. Similarly, the technology in EP 0 406 911 A1 can only provide films with maximum thicknesses of 3 to 3.5 μm without cracking. At larger film thicknesses cracking occurs, and of course the flexibility that would permit the fabrication of an independent film is absent.

We have already discovered (see Japanese Patent Application Numbers Hei 7-208087 (208,087/1995) and Hei 7-208143 (208,143/1995)) that a coating that combines flexibility with high heat resistance is provided by the cure of a polymethylsilsesquioxane having a molecular weight and hydroxyl content in specific ranges and preferably prepared by a special method.

Japanese Patent Application Laid Open (Kokai or Unexamined) Number Sho 51-2736 (2,736/1976) discloses the dispersion of waterborne colloidal silica in a water-lower aliphatic alcohol solution of the partial condensate of $RSi(OH)_3$. However, this cannot be applied to steel sheet, etc., due to its acidity (pH=3 to 6). Moreover, the water repellency of the corresponding cured film is not high enough, as will be shown below in a comparative example.

Japanese Patent Publication (Kokoku) Number Sho 62-55554 (55,554/1987) discloses a waterborne coating composition with a pH of 7.1 to 7.8. This is a dispersion of waterborne colloidal silica in a water-aliphatic alcohol solution of the partial condensate of $RSi(OH)_3$. However, this reference makes no mention of the water repellency.

A coating originating from a composition containing organotrialkoxysilane and acidic colloidal silica (waterborne) is disclosed in Japanese Patent Application Laid Open (Kokai or Unexamined) Number Hei 5-163463 (163,463/1993). Other essential components in this composition are additional organotrialkoxysilane, alcohol, and pigment. While this coating is reported to have an excellent hardness, water resistance, resistance to staining, aging resistance, and so forth, its water repellency (contact angle versus water) and processability (flexibility) are not elucidated and of course it is not transparent since it contains pigment.

Highly water-repellent coatings can be obtained by providing the coating surface with a microfine irregularity or roughness through the addition of relatively large particles with diameters in excess of 1 μm, as disclosed in, for example, Japanese Patent Application Laid Open (Kokai or Unexamined) Number Hei 3-244679 (244,679/1991). However, due to the presence of large particles whose size exceeds the thickness of the film itself, the physical properties of the film, such as hardness and processability, are poor, and of course the film is again not transparent.

Fluorocarbon resins do provide transparent and water-repellent films, but these films generally have a low surface hardness and thus do not always have a good staining resistance. These resins are also expensive.

SUMMARY OF THE INVENTION

The object of the present invention is to provide a curable polymethylsilsesquioxane composition that uses polymethylsilsesquioxane obtained from inexpensive precursors and that provides a highly corrosion-resistant, highly water-repellent, and transparent cured film and does so while maintaining the physical properties required of a coating, such as surface hardness and processability.

The present inventors have discovered that the combination of colloidal silica (wherein primary particle diameter is approximately 10 nm) and polymethylsilsesquioxane, with a molecular weight and hydroxyl content in specific ranges— and preferably prepared by a special method—yields a highly corrosion-resistant, highly water-repellent, and transparent cured film and does so while maintaining the physical properties required of a coating, such as surface hardness and processability.

The polymethylsilsesquioxane of the present invention has a predetermined number-average molecular weight, Mn, from 380 to 2,000, as determined by gel permeation chromatography calibrated with polystyrene standards. The polymethylsilsesquioxane of the invention is represented by the general formula $$(CH_3SiO_{3/2})_n(CH_3Si(OH)O_{2/2})_m$$

wherein m and n are positive numbers that provide the predetermined Mn, with the proviso that the value of m/(m+n) is less than or equal to $0.152/(Mn \times 10^{-3})+0.10$ and greater than or equal to $0.034/(Mn \times 10^{-3})$. Hence, the boundary conditions for the polymethylsilsesquioxane of the invention can be graphically illustrated with equations (1) through (4), as set forth in FIG. 1.

DETAILED DESRIPTION OF THE INVENTION

Figure 1:
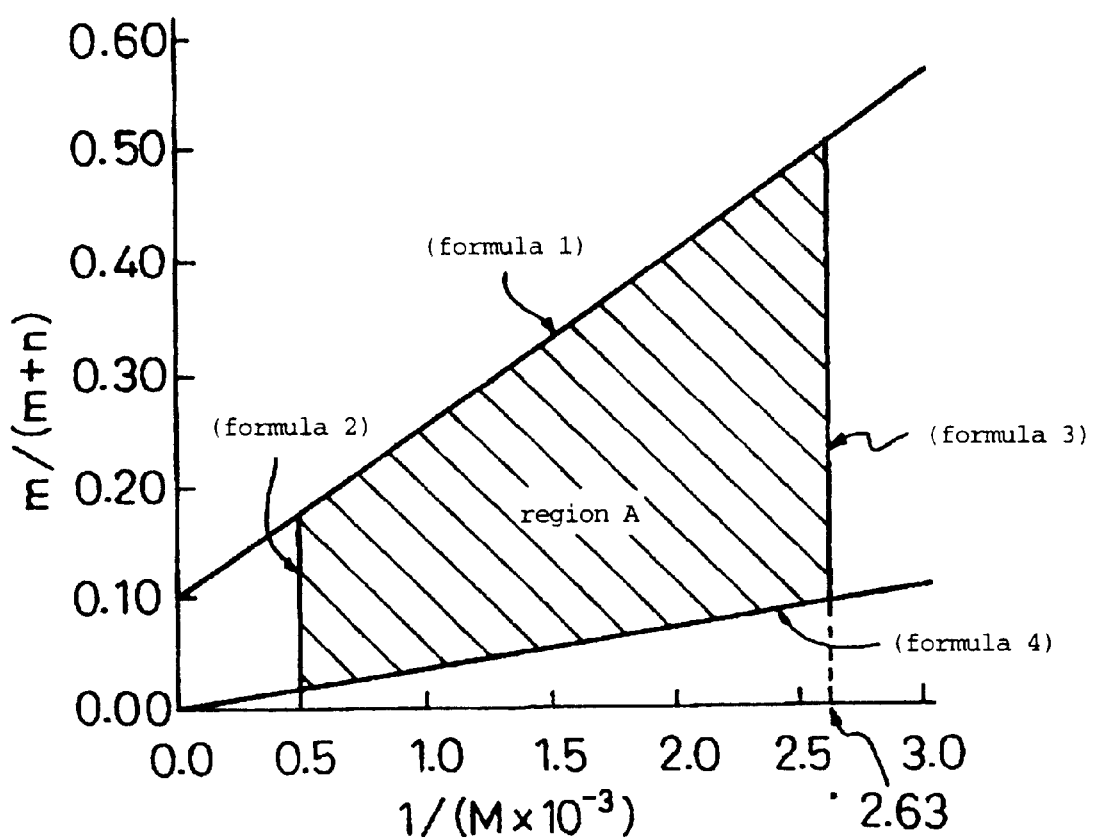
FIG. 1 is a graph of the ratio of M/(m+n) vs. $1/(Mn \times 10^{-3})$ of the boundary conditions of the polymethylsilsesquioxane resins of the invention represented by the general formula $(CH_3SiO_{3/2})_n(CH_3Si(OH)O_{2/2})_m$ and having a predetermined Mn between 380 and 2,000 as defined by the region A bounded by equations (1) to (4), below (1) $m/(m+n)=0.152/(Mn \times 10^{-3})+0.10$ (2) $1/(Mn \times 10^{-3})=1000/2000$ (3) $1/(Mn \times 10^{-3})=1000/380$ (4) $m/(m+n)=0.034/(Mn \times 10^{-3})$

The curable polymethylsilsesquioxane of the invention comprises the combination of a polymethylsilsesquioxane of the general formula $(CH_3SiO_{3/2})_n(CH_3Si(OH)O_{2/2})_m$ and colloidal silica in an amount from 5 to 250 weight parts per 100 weight parts of the said polymethylsilsesquioxane.

When the number average molecular weight, Mn, of the polymethylsilsesquioxane falls outside the range given above, or when the silanol content $(CH_3Si(OH)O_{2/2})_m$ exceeds the upper limit given above, cracking readily occurs in the cured product. When the silanol content falls below the lower limit given above, the curability of the product is inadequate.

The polymethylsilsesquioxane used in the formulation of the present invention has a molecular weight and silanol content in the above-specified ranges. It is preferably prepared by hydrolyzing a methyltrihalosilane MeSiX₃ (wherein Me is methyl and X is a halogen atom selected from the group consisting of F, Cl, Br, and I) and condensing the resulting hydrolysis product, wherein the preparation is run in a two-phase system of water and solvent selected from the group consisting of (a) oxygenated organic solvents and (b) a mixture of oxygenated organic solvent and at least one hydrocarbon solvent, provided that the mixture contains no more than 50 volume % of the hydrocarbon solvent.

The curable polymethylsilsesquioxane of the invention cures into a product that has an excellent flexibility, heat resistance, water repellency, and corrosion resistance.

The type of colloidal silica used in the formulation of the present invention is not critical as long as it exhibits the specified effects when used in the curable polymethylsilsesquioxane composition according to the present invention. An organic solvent-borne colloid having a particle diameter of 10 to 50 nanometers will generally be used. Suitable dispersing solvents are exemplified by isopropyl alcohol, ethylene glycol mono-n-propyl ether, methyl ethyl ketone (MEK), xylene/n-butanol, and methyl isobutyl ketone (MIBK).

The colloidal silica is preferably used at from 5 to 250 weight parts per 100 weight parts polymethylsilsesquioxane. The use of less fails to provide a definite effect from its addition, while the use of more causes the cured film to become brittle. A solution of the composition according to the present invention can be prepared through the use of organic solvent-borne colloidal silica since the polymethylsilsesquioxane used in the present invention is soluble in aromatic hydrocarbon solvents such as benzene, toluene, and xylene; ether solvents such as diethyl ether and tetrahydrofuran; alcohol solvents such as isopropyl alcohol, butanol, and hexanol; ketone solvents such as acetone, methyl ethyl ketone, and methyl isobutyl ketone; ester solvents such as ethyl acetate and butyl acetate; and halohydrocarbon solvents such as chloroform, trichloroethylene, and carbon tetrachloride. Even when a waterborne colloidal silica is used, the invention composition can still be prepared through the co-use of an organic solvent such as isopropyl alcohol and so forth. However, the use of an organic solvent-borne colloidal silica is preferred because it affords a better compatibility between the polymethylsilsesquioxane and silica.

The solids concentration in solutions of the present composition is not critical. While the optimal solids concentration will vary as a function of the thickness of the dried film and the coating method, values from 0.5 to 60 volume % are suitable in practice.

Cure of the composition according to the present invention can be effected using an optional catalyst or optional crosslinker or by simply heating. When a catalyst or crosslinker is used, the solution of the composition is combined with the catalyst or crosslinker and curing is then effected with heating. In the case of cure by heating alone, cure is effected at 50° C. to 350° C. and preferably at 80° C. to 250° C. The reaction does not proceed at temperatures below 50° C., while temperatures higher than 350° C. run the risk of siloxane decomposition.

Suitable curing catalysts are exemplified by tin compounds such as tin diacetate, tin dioctylate, tin dilaurate, tin tetraacetate, dibutyltin diacetate, dibutyltin dioctylate, dibutyltin dilaurate, dibutyltin dioleate, dimethoxydibutyltin, dibutyltin oxide, dibutyltin benzylmaleate, bis(triethoxysiloxy)dibutyltin, and diphenyltin diacetate; titanium compounds such as tetramethoxytitanium, tetraethoxytitanium, tetra-n-propoxytitanium, tetraisopropoxytitanium, tetra-n-butoxytitanium, tetraisobutoxytitanium, tetrakis(2-ethylhexoxy)titanium, di—isopropoxybis(ethyl acetoacetate)titanium, dipropoxybis(acetylacetonato)titanium, diisopropoxybis(acetylacetonato)titanium, dibutoxybis(acetylacetonato) titanium, triisopropoxyallylacetate titanium, titanium isopropoxyoctylene glycol, and bis(acetylacetonato)titanium oxide; metal/fatty acid salts such as lead diacetate, lead bis(2-ethylhexanoate), lead dineodecanoate, lead tetraacetate, lead tetrakis(n-propionate), zinc diacetate, zinc bis(2-ethylhexanoate), zinc dineodecanoate, zinc diundecenoate, zinc dimethacrylate, iron diacetate, zirconium tetrakis(2-ethylhexanoate), zirconium tetrakis(methacrylate), and cobalt diacetate; and amino-containing compounds such as aminopropyltrimethoxysilane, N-(2-aminoethyl)-3-aminopropyltrimethoxysilane, tetramethylguanidine, tetramethylguanidylpropyltrimethoxysilane, tetramethylguanidylpropyldimethoxysilane, tetramethylguanidylpropyltris(trimethylsiloxy)silane, and 1,8-diazabicyclo(5.4.0.)-7-undecene. These curing catalysts will generally be used at from 0.01 to 10 weight parts per 100 weight parts of the polymethylsilsesquioxane and are preferably used at from 0.1 to 5 weight parts per 100 weight parts of the polymethylsilsesquioxane.

Suitable crosslinkers are exemplified by the following compounds

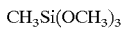

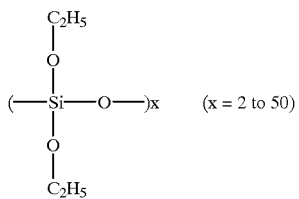

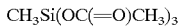

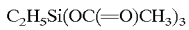

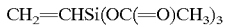

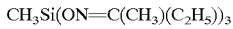

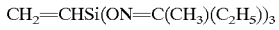

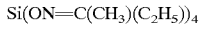

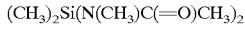

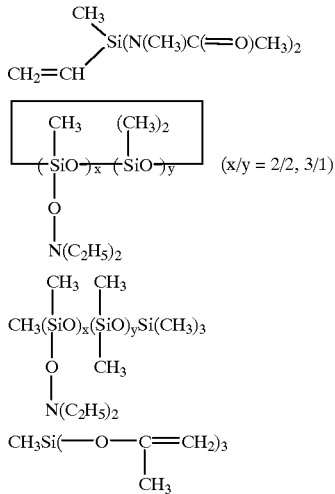

The crosslinker will be used generally at from 0.1 to 80 weight parts and preferably at from 1 to 70 weight parts, in each case per 100 weight parts of the polymethylsilsesquioxane. The curing temperature for use of either a catalyst or crosslinker will be from 20° C. to 350° C. and preferably from 20° C. to 250° C. Curing temperatures in excess of 350° C. run the risk of siloxane decomposition.

Optimal methods for synthesizing polymethylsilsesquioxane having a molecular weight and hydroxyl content in the above-specified ranges are exemplified by the following:

(1) forming a two-phase system of water and solvent, wherein the solvent is selected from the group consisting of (a) an oxygenated organic solvent or
  (b) a mixture of oxygenated organic solvent and hydrocarbon solvent that contains no more than 50 volume % of the hydrocarbon solvent, adding the below-described (A) or (B) dropwise to this system to hydrolyze the (A) methyltrihalosilane, and effecting condensation of the resulting hydrolysis product, wherein (A) is the methyltrihalosilane $MeSiX_3$ (Me=methyl and X is a halogen atom selected from F, Cl, Br, and I) and
  (B) is the solution afforded by dissolving such a methyltrihalosilane in solvent selected from the group consisting of
    (a) an oxygenated organic solvent or
    (b) a mixture of an oxygenated organic solvent and hydrocarbon solvent that contains no more than 50 volume % of the hydrocarbon solvent;

(2) the same method as described under (1), but in this case effecting reaction in the two-phase system resulting from the dropwise addition of the solution described in (B)-(1) to only water;

(3) the same method as described under (1), but in this case effecting reaction in the two-phase system resulting from the simultaneous dropwise addition of water and the solution described in (B)-(1) to an empty reactor.

X in the subject methyltrihalosilane (A) is preferably bromine or chlorine and more preferably is chlorine. As used herein, the formation of a two-phase system of water and organic solvent refers to a state in which the water and organic solvent are not miscible and hence will not form a homogeneous solution. This includes the maintenance of a layered state by the organic layer and water layer through the use of slow-speed stirring as well as the generation of a suspension by vigorous stirring. Below these phenomena are referred to as the "formation of two layers".

The organic solvent used in the subject preparative methods is an oxygenated organic solvent that can dissolve the methyltrihalosilane and, although possibly evidencing some solubility in water, can nevertheless form a two-phase system with water. The organic solvent can contain up to 50 volume % hydrocarbon solvent. The use of more than 50 volume % hydrocarbon solvent is impractical because this causes gel production to increase at the expense of the yield of the target product. Even an organic solvent with an unlimited solubility in water can be used when such a solvent is capable of forming two phases with the aqueous solution of a water-soluble inorganic base or with the aqueous solution of a weak acid salt with a buffering capacity.

Suitable oxygenated organic solvents are exemplified by—but not limited to—ketone solvents such as methyl ethyl ketone, diethyl ketone, methyl isobutyl ketone, acetylacetone, cyclohexanone, and so forth; ether solvents such as diethyl ether, di-n-propyl ether, dioxane, the dimethyl ether of diethylene glycol, tetrahydrofuran, and so forth; ester solvents such as ethyl acetate, butyl acetate, butyl propionate, and so forth; and alcohol solvents such as n-butanol, hexanol, and so forth. The ketone, ether, and alcohol solvents are particularly preferred among the preceding. The oxygenated organic solvent may also take the form of a mixture of two or more selections from the preceding. Suitable hydrocarbon solvents are exemplified by—but again not limited to—aromatic hydrocarbon solvents such as benzene, toluene, xylene, and so forth; aliphatic hydrocarbon solvents such as hexane, heptane, and so forth; and halogenated hydrocarbon solvents such as chloroform, trichloroethylene, carbon tetrachloride, and so forth.

The quantity of the organic solvent which is used is not critical, but preferably is in the range from 50 to 2,000 weight parts per 100 weight parts of the methyltrihalosilane. The use of less than 50 weight parts organic solvent per 100 weight parts methyltrihalosilane is inadequate for dissolving the polymethylsilsesquioxane product and, depending on the circumstances, will not give polymethylsilsesquioxane in the desired molecular weight range due to an overly high molecular weight. The use of more than 2,000 weight parts organic solvent can lead to slow development of the hydrolysis and condensation of the methyltrihalosilane and hence to the failure to obtain polymethylsilsesquioxane in the desired molecular weight range.

While the quantity of water used is not critical, the water is preferably used at from 10 to 3,000 weight parts per 100 weight parts methyltrihalosilane.

Reaction is possible even with the use of water entirely free of additives as the aqueous phase; however, such a system will give a polymethylsilsesquioxane product with an elevated molecular weight since the reaction is accelerated by the hydrogen chloride evolved from the chlorosilane. Polymethylsilsesquioxane with a relatively lower molecular weight can therefore be synthesized through the addition of water-soluble inorganic base capable of controlling the acidity or a weak acid salt with a buffering capacity.

Such water-soluble inorganic bases are exemplified by water-soluble alkalis such as the lithium, sodium, potassium, calcium, and magnesium hydroxides. The subject weak acid salt with a buffering capacity is exemplified by—but not limited to—carbonates such as the sodium, potassium, calcium, and magnesium carbonates; bicarbonates such as the sodium and potassium bicarbonates; oxalates such as potassium trihydrogen bis(oxalate); carboxylates such as potassium hydrogen phthalate and sodium acetate; phosphates such as disodium hydrogen phosphate and potassium dihydrogen phosphate; and borates such as sodium tetraborate. These are preferably used at $\leq 1.8$ gram-equivalents per 1 mole halogen atom from the trihalosilane molecule. In other words, these are preferably used at up to 1.8-times the quantity that just neutralizes the hydrogen halide that is produced when the halosilane is completely hydrolyzed. The use of larger amounts facilitates the production of insoluble gel. Mixtures of two or more of the water-soluble inorganic bases and mixtures of two or more of the buffering weak acid salts can be used as long as the above-specified quantity range is obeyed.

The methyltrihalosilane hydrolysis reaction bath can be stirred slowly at a rate that maintains two layers (aqueous phase and organic solvent) or can be strongly stirred so as to give a suspension. The reaction temperature is suitably in the range from ambient (20° C.) temperature to 120° C. and is preferably from about 40° C. to 100° C.

The curable polymethylsilsesquioxane according to the present invention may contain small amounts of units not specifically included in the claimed structure that originate from impurities that may be present in the precursors. These units are exemplified by units bearing non-methyl lower alkyl, monofunctional units as represented by $R_3SiO_{1/2}$ (where R is the lower alkyl), difunctional units as represented by $R_2SiO_{2/2}$ (where R is the lower alkyl), and tetrafunctional units as represented by $SiO_{4/2}$. The curable polymethylsilsesquioxane under consideration contains the OH group and has the structure specified by the structural formula given above; however, its structure may also contain very small levels of OH-functional units other than that in the specified structural formula. Thus, the curable polymethylsilsesquioxane according to the present invention has the structure represented by the chemical formula provided above, but may contain structural units produced by the mechanisms outlined above insofar as the effects of the present invention are not adversely effected.

EXAMPLES

The present invention is explained in greater detail in the following through working and comparative examples, but is not limited to these examples.

Substrates

Steel sheet: JIS G-3141 (SPCC-SB), 0.3 mm×50 mm×150 mm

Aluminum sheet: JIS H-4000 (Al050P), 0.3 mm×50 mm×150 mm

Glass plate: JIS R-3202 (float glass plate), 2.0 mm×50 mm×50 mm

Film test methods

Using a multipurpose film thickness meter (LZ-200 from Ketto Kagaku Kenkyusho), the film thickness was measured electromagnetically on the steel sheet substrate and was measured by a high-frequency method on the aluminum sheet and glass plate substrates.

The pencil hardness was measured using pencils for pencil scratch testing that had been validated by Nippon Toryo Kensa Kyokai. Testing was carried out by the manual scratch method of JIS K-5400: scratching was effected by pressing the pencil down with the greatest force that would not crumble the lead, and the hardness symbol is reported for the pencil that did not cause any film scratching. The softness of the substrate in the case of the aluminum sheet caused lower apparent values due to indention of the substrate by this method.

The adherence was evaluated using the crosshatch tape test described in JIS K-5400, in which a score of 10 is the best possible score.

The flexural resistance was evaluated using the flexure tester described in JIS K-5400. Cracking and debonding were evaluated using a 2 mm diameter mandrel on a scale in which a score of 10 is the best possible score.

The contact angle versus water was measured using a contact angle meter (Model CA-D from Kyowa Kaimen Kagaku).

The salt-spray test used the apparatus described in JIS K-5400. A 5 weight % aqueous sodium chloride solution was sprayed at 35°C. For the steel sheet substrate the test time required for the rust area to reach 50% is reported. For the aluminum sheet substrate the test time required for the production of rust is reported.

Reference Example 1

63.5 g (0.60 mol) sodium carbonate and 400 mL water were introduced into a reactor equipped with a reflux condenser, addition funnel, and stirrer. 400 mL methyl isobutyl ketone was added while stirring. The stirring rate was sufficiently slow that the organic layer and aqueous layer remained intact. Into this was gradually added 74.7 g (0.5 mol) methyltrichlorosilane dropwise from the addition funnel. During this period the temperature of the reaction mixture rose to 50° C. The reaction mixture was then heated and stirred on an oil bath at 60° C. for an additional 24 hours. After completion of the reaction, the organic layer was washed with water until the wash water reached neutrality and was then dried over a drying agent. The drying agent was subsequently removed and the solvent was distilled off at reduced pressure. Drying overnight in a vacuum then gave polymethylsilsesquioxane as a white solid. The following results were obtained when the molecular weight distribution of this polymethylsilsesquioxane was measured by GPC calibrated with polystyrene standards (solvent=chloroform, columns=2×TSKgelGMH$_{HR}$-L (brand name) from Tosoh, instrument=HLC-8020 from Tosoh): weight-average molecular weight=3,270; number-average molecular weight=920. The hydroxyl group content as determined from the $^{29}$Si-NMR spectrum (measured with an ACP-300 from Bruker) was 0.22 per silicon atom (this 0.22 corresponded to the value of m/(m+n)).

Reference Example 2

While stirring 2 L water and 1.5 L methyl isobutyl ketone in a reactor as described in Reference Example 1 with sufficient vigor that 2 layers did not form, 745 g (5.0 mol) methyltrichlorosilane dissolved in 0.5 L methyl isobutyl ketone was gradually added dropwise at a rate such that the temperature of the reaction mixture did not exceed 50° C. The reaction mixture was then additionally stirred and heated for 2 hours on an oil bath at 50° C. Work up as in Reference Example 1 gave polymethylsilsesquioxane as a white solid. Analysis of the molecular weight distribution of this polymethylsilsesquioxane as in Reference Example 1 gave the following results: weight-average molecular weight=9,180; number-average molecular weight=1,060. 0.22 hydroxyl per silicon atom was determined.

Reference Example 3

A reactor was set up with a reflux condenser, two addition funnels, and a stirrer. A mixed solution of 40 mL methyl isobutyl ketone and 14.9 g (0.1 mol) methyltrichlorosilane was placed in one addition funnel, while 40 mL water was placed in the other addition funnel. The contents of the two addition funnels were simultaneously added dropwise to the empty reactor while the reactor was cooled on an ice bath. Stirring was carried out with sufficient vigor that two layers did not form. After completion of the addition, the reaction mixture was heated and stirred for 2 hours in an oil bath at 50° C. After completion of the reaction, the reaction was worked up as in Reference Example 1 to give polymethylsilsesquioxane as a white solid. Analysis of the molecular weight distribution of this polymethylsilsesquioxane as in Reference Example 1 gave the following results: weight-average molecular weight=1,320; number-average molecular weight=600. 0.24 hydroxyl per silicon atom was determined.

Example 1

To 100 weight parts of the polymethylsilsesquioxane of Reference Example 1 were added 333 weight parts of a dispersion of colloidal silica in methyl ethyl ketone (MEK-ST from Nissan Kagaku Kogyo, 30 weight % solids) and 124 weight parts methyl ethyl ketone (solids=25 volume % assuming a specific gravity of 1 for the polymethylsilsesquioxane; 100 weight parts silica per 100 weight parts polymethylsilsesquioxane). A coating composition was then prepared by the addition of 0.25 weight part tin dioctylate as catalyst. This coating composition was applied to the steel sheet using a bar coater and then cured in a 200° C. oven for 1.5 hours to give a 6 μm-thick film. The test results for this film are reported in Table 1.

Example 2

A coating composition was prepared as in Example 1, but in this case starting from the polymethylsilsesquioxane of Reference Example 2. This coating composition was applied to the aluminum sheet and cured as in Example 1 to give a 6 μm-thick film. The test results for this film are reported in Table 1.

Example 3

The coating composition prepared in Example 1 was coated on the glass plate and cured as in Example 1 to give a 6 μm-thick film. The test results for this film are reported in Table 1.

Example 4

A coating composition was prepared as in Example 1, but in this case using 150 weight parts silica per 100 weight parts polymethylsilsesquioxane. This coating composition was applied to the steel sheet and cured as in Example 1 to give a 6 μm-thick film. The test results for this film are reported in Table 1.

Example 5

The coating composition described in Example 1 was coated on the aluminum sheet and cured as in Example 1 to give a 6 μm-thick film. The test results for this film are reported in Table 1.

Example 6

The coating composition described in Example 1 was coated on the aluminum sheet and cured as in Example 1 to give a 1 μm-thick film. The test results for this film are reported in Table 1.

Example 7

A coating composition was prepared as in Example 1, but in this case starting from the polymethylsilsesquioxane of Reference Example 3. This coating composition was applied to the steel sheet and cured as in Example 1 to give a 6 μm-thick film. The test results for this film are reported in Table 1.

Comparative Example 1

To 100 weight parts of the polymethylsilsesquioxane of Reference Example 1 was added 186 weight parts methyl ethyl ketone (solids=30 volume % assuming a specific gravity of 1 for the polymethylsilsesquioxane). A coating composition was then prepared by the addition of 0.25 weight part tin dioctylate as catalyst. This coating composition was applied and cured onto the steel sheet as in Example 1 to give a 6 μm-thick film. The test results for this film are reported in Table 1. The contact angle versus water and the corrosion resistance of this film were both inferior to the corresponding values for the films in the working examples.

Comparative Example 2

A coating agent as described in Example 1 of Japanese Patent Application Laid Open (Kokai or Unexamined) Number Sho 51-2736 was applied to the steel sheet using a bar coater and then cured in a 150° C. oven for 30 minutes. However, a sample suitable for testing could not be prepared because rust appeared on the steel sheet and the coating cracked and debonded.

Comparative Example 3

The coating agent described in Comparative Example 2 was coated on the aluminum sheet and cured in a 150° C. oven for 30 minutes to give a 6 µm-thick film. The test results for this film are reported in Table 1. This film had a poor adherence and also gave poorer results for the contact angle versus water and the corrosion resistance.

Reference Example 4

Polymethylsilsesquioxane was prepared by the HCl-mediated hydrolysis and condensation of methyltrimethoxysilane using a literature method (S. Nakahama, et al., *Contemp. Top. Polym. Sci.*, 1984, Volume 4, page 105; Y. Abe, et al., *J. Polym. Sci. Part A Polym. Chem.*, 1995, Volume 33, page 751). Analysis of the molecular weight distribution of the polymethylsilsesquioxane by the method described in Reference Example 1 gave the following results: weight-average molecular weight=2,150; number-average molecular weight=660. This polymethylsilsesquioxane contained both hydroxyl and methoxy. The hydroxyl and methoxy contents as determined from the $^{29}$Si-NMR and $^1$H-NMR spectra were 0.216 and 0.057, respectively, per silicon atom.

Comparative Example 4

A silica-free coating composition was prepared as in Comparative Example 1 using the polymethylsilsesquioxane prepared in Reference Example 4. This coating composition was applied and cured onto the steel sheet as in Example 1 to provide a 6 µm-thick film. The test results for this film are reported in Table 1. The contact angle versus water and the corrosion resistance for this film were both inferior to those of the films in the working examples.

Comparative Example 5

A silica-containing coating composition was prepared as in Example 1 using the polymethylsilsesquioxane of Reference Example 4 and a methyl isobutyl ketone dispersion of colloidal silica (MIBK-ST, 30 weight % solids, from Nissan Kagaku Kogyo Kabushiki Kaisha). MIBK-ST exhibited a better compatibility with this polymethylsilsesquioxane resin than did MEK-ST. This coating composition was then applied and cured onto the steel sheet as in Example 1 to give a 6 µm-thick film. The test results for this film are reported in Table 1. No increase in the contact angle versus water was observed as a result of the addition of the colloidal silica.

Comparative Example 6

A silica-free coating composition was prepared as in Comparative Example 1 using SR2400 methylsilicone resin from Dow Corning Toray Silicone Company, Limited. This coating composition was applied and cured onto the steel sheet as in Example 1 to give a 6 µm-thick film. The test results for this film are reported in Table 1. The pencil hardness, contact angle versus water, and corrosion resistance for this film were all inferior to those of the films in the working examples.

Comparative Example 7

A silica-containing coating composition was prepared as in Example 1 using the SR2400 referenced in Comparative Example 6 and MIBK-ST, which was more compatible with this resin than the MEK-ST. This coating composition was applied and cured onto the steel sheet as in Example 1 to give a 6 µm-thick film. The test results for this film are reported in Table 1. This film was white and had a very low pencil hardness due to its brittle character. It also had a poor adherence.

Comparative Example 8

To a mixture of 100 weight parts of the polymethylsilsesquioxane described in Reference Example 1, 100 weight parts fumed silica R972 from Nippon Aerosil Kabushiki Kaisha, and 760 weight parts methyl isobutyl ketone (13.3 volume % solids assuming the specific gravity of the polymethylsilsesquioxane is 1; 100 weight parts silica per 100 weight parts of the polymethylsilsesquioxane) was added 800 weight parts glass beads, and the silica was dispersed by stirring. Addition of the same catalyst as in Example 1 then gave a coating composition. This coating composition was applied and cured onto the steel sheet as in Example 1 to give a 6 µm-thick film. The test results for this film are reported in Table 1. This film was white and had a very low pencil hardness due to its brittle nature. Its adherence and corrosion resistance were also poor.

TABLE 1

| Example number | substrate | film thickness (µm) | appearance | pencil hardness | adherence | flexural resistance | contact angle versus water (degrees) | salt-spray test (hours) |
|---|---|---|---|---|---|---|---|---|
| Example 1 | steel sheet | 6 | transparent | 4H | 10 | 10 | 119.2 | >216 |
| Example 2 | Al sheet | 6 | transparent | H | 10 | 10 | 120.5 | >216 |
| Example 3 | glass plate | 6 | transparent | 4H | 10 | —[a] | 121.2 | —[a] |
| Example 4 | steel sheet | 6 | transparent | 4H | 10 | 10 | 115.4 | >216 |
| Example 5 | Al sheet | 6 | transparent | H | 10 | 10 | 122.2 | >216 |
| Example 6 | Al sheet | 1 | transparent | H | 10 | 10 | 118.4 | >216 |
| Example 7 | steel sheet | 6 | transparent | 4H | 10 | 10 | 120.2 | >216 |
| Comp. | steel | 6 | transparent | 4H | 10 | 10 | 97.2 | 24 |

TABLE 1-continued

| Example number | substrate | film thickness (μm) | appearance | pencil hardness | adherence | flexural resistance | contact angle versus water (degrees) | salt-spray test (hours) |
|---|---|---|---|---|---|---|---|---|
| Example 1 | sheet | | | | | | | |
| Comp. Example 2 | steel sheet | —[b] | red rust color and debonding | —[b] | —[b] | —[b] | —[b] | —[b] |
| Comp. Example 3 | Al sheet | 6 | transparent | H | 4 | 10 | 93.0 | 24 |
| Comp. Example 4 | steel sheet | 6 | transparent | 4H | 10 | 10 | 96.2 | 48 |
| Comp. Example 5 | steel sheet | 6 | transparent | 4H | 10 | 10 | 98.7 | >216 |
| Comp. Example 6 | steel sheet | 6 | transparent | HB | 10 | 10 | 100.7 | 168 |
| Comp. Example 7 | steel sheet | 6 | white | <6B | 8 | 10 | 128.3 | >216 |
| Comp. Example 8 | steel sheet | 6 | white | <6B | 2 | 10 | 141.7 | 24 |

[a]not measured
[b]could not be measured

This invention provides a curable polymethylsilsesquioxane composition whose cured polymethylsilsesquioxane product is sufficiently flexible that it can be used as an independent film or thick film not heretofore accessible by the prior art. Moreover, this curable polymethylsilsesquioxane composition provides a highly water-repellent and strongly corrosion-resistant cured film and does so without a loss of transparency or a decline in the physical properties required of a coating, such as surface hardness and processability. These properties make possible the use of the cured film in a wide range of applications. The curable polymethylsilsesquioxane coating compositions of the present invention have utility for forming water-repellent, corrosion-resistant and scratch-resistant films and coatings.

Although various features and advantages of the present invention have been described herein and illustrated by way of example, the scope of the present invention is not limited thereto and should be judged solely in accordance with the following claims and equivalents thereof.

What is claimed is:

1. A method for preparing a curable polymethylsilsesquioxane composition comprising:

1) preparing a polymethylsilsesquioxane by (1) a process comprising
      i) forming a two-phase system of water and solvent, wherein the solvent is selected from the group consisting of
         a) an oxygenated organic solvent, and
         b) a mixture comprising the oxygenated organic solvent and a hydrocarbon solvent, with the proviso that the mixture contains no more than 50 volume % of the hydrocarbon solvent; and
      ii) adding to the two-phase system a material selected from the group consisting of
         c) a methyltrihalosilane of the formula $CH_3SiX_3$, wherein X is a halogen atom selected from the group consisting of F, Cl, Br, and I; and
         d) a solution comprising the methyltrihalosilane and the solvent selected from the group consisting of a) and b), or (2) adding the solution d) to water, forming a two-phase system of water and solvent; and 2) adding colloidal silica to the polymethylsilsesquioxane prepared in step 1), wherein the colloidal silica is added in an amount of 5 to 250 weight parts of colloidal silica per 100 weight parts of the polymethylsilsesquioxane, and with the proviso that the colloidal silica is organic solvent-borne colloidal silica, wherein said polymethylsilsesquioxane has a predetermined number-average molecular weight, Mn, from 380 to 2,000, as determined by gel permeation chromatography calibrated with polystyrene standards and being represented by the general formula $$(CH_3SiO_{3/2})_n(CH_3Si(OH)O_{2/2})_m$$

wherein m and n are positive numbers that provide the predetermined Mn, with the proviso that the value of $m/(m+n)$ is less than or equal to $0.152/(Mn \times 10^{-3})+0.10$ and greater than or equal to $0.034/(Mn \times 10^{-3})$.

2. The method of claim 1, wherein the oxygenated organic solvent is selected from the group consisting of ketones, esters, and ethers.

3. The method of claim 1, wherein the two-phase system of water and solvent further comprises a buffer selected from the group consisting of a water-soluble inorganic base and a weak acid salt being dissolved in the water in an amount less than or equal to 1.8 gram-equivalents per 1 mole of halogen atoms in the methyltrihalosilane.

4. The method of claim 1, wherein the curable polymethylsilsesquioxane composition further comprises a crosslinker.

5. The method of claim 1, wherein the curable polymethylsilsesquioxane composition further comprises a catalytic amount of a curing catalyst.

6. The method of claim 1 further comprising adding d) into a reactor containing water.

7. The method of claim 1 further comprising adding d) and water simultaneously into a reactor.

* * * * *